United States Patent [19]
Barrowman

[11] Patent Number: 5,743,090
[45] Date of Patent: Apr. 28, 1998

[54] HYDRAULIC TORQUE TRANSMITTER AND SYNCHRONIZER

[76] Inventor: Andrew W. Barrowman, 330 W. Stevens Ave., Wyckoff, N.J. 07481

[21] Appl. No.: 537,304

[22] Filed: Sep. 29, 1995

[51] Int. Cl.$^6$ .......................... F16D 39/00; F16B 13/04
[52] U.S. Cl. .................. 60/488; 92/12.2; 92/57; 92/71; 417/269
[58] Field of Search .................. 60/536, 487, 488; 92/12.2, 57, 71; 417/269

[56] References Cited

U.S. PATENT DOCUMENTS

| | | |
|---|---|---|
| 386,116 | 7/1888 | Bois . |
| 1,931,952 | 10/1933 | Charles . |
| 2,198,965 | 4/1940 | Habig et al. ............................ 60/536 |
| 2,584,650 | 2/1952 | Audemar et al. . |
| 2,597,050 | 5/1952 | Audemar et al. . |
| 3,938,332 | 2/1976 | Roces ...................................... 60/536 |
| 4,781,025 | 11/1988 | Christ ....................................... 60/536 |
| 4,815,358 | 3/1989 | Smith ...................................... 92/12.2 |
| 4,979,877 | 12/1990 | Shimizu .................................. 92/71 X |
| 5,055,004 | 10/1991 | Ebbing et al. ....................... 92/12.2 X |
| 5,079,996 | 1/1992 | Abousabha et al. .................... 92/71 X |
| 5,101,925 | 4/1992 | Walker ................................. 60/487 X |

*Primary Examiner*—Hoang Nguyen
*Attorney, Agent, or Firm*—W. Patrick Quast, Esq.

[57] ABSTRACT

Two synchronous hydraulic polyphase motor-generators with axial cylinders are connected by rigid or flexible pipes. One functions as a generator, the other as a motor to transmit torque and power. Sinusoidal piston motion is developed without the use of cams. The pistons cause columns of fluid to alternate between motor and generator, producing synchronous rotation. Apparatus for synchronizing, coupling and decoupling the motive force are disclosed.

12 Claims, 8 Drawing Sheets

HYDRAULIC TORQUE TRANSMITTER AND SYNCHRONIZER

FIELD OF THE INVENTION

This invention relates to all wheel drive systems for vehicles, power transmission, remote positioning systems, drive shafts with universal couplings, marine propeller shafts, constant velocity joints, flexible drive shafts, hydraulic motors and pumps, clutches and synchronizing devices.

BACKGROUND OF THE INVENTION

Polyphase synchronous hydraulic power transmission has been previously considered as an alternative to large scale electric or mechanical power transmission methods. The present invention is intended to address applications which require torque transmission between a driving shaft and a driven shaft where the spatial relationship between the two shafts may be continuously changing. The torque and power capacities of the present invention are considerable in relation to the weight and overall dimensions of the motor-generators.

Polyphase hydraulic systems will only transmit torque if an essentially constant volume of fluid is contained within each hydraulic phase during the entire cycle. If the geometry of the mechanism does not result in a complementary exchange of fluid between opposing cylinders throughout a cycle, the sum of the fluid displaced by opposing pistons plus the connection volume will not be constant and therefore a constant angular relationship between motor and generator drive shafts cannot be maintained. Due to the incompressible nature of hydraulic fluid, a geometry which does not maintain constant volume allows the motor and generator to lock in a deadly embrace.

The motor will tend to stall if there is insufficient fluid in a phase to propel the motor to a point where the next phase in the cycle can deliver enough force to maintain rotation under load. Thus, it is essential to prevent the loss of significant amounts of fluid from a phase. Lost fluid causes the angle between the generator and motor to change. Fluid can escape from a phase through the clearance between pistons and cylinders. This fluid loss must be periodically replenished to limit changes in the angle between motor and generator.

Any elasticity in the parts comprising the phase results in a temporary loss of fluid when the phase is subjected to the considerable pressures which can develop under load. Some elasticity in the phase connections is unavoidable but it must be limited to prevent too much change in the angle between motor and generator while the device is operating within its specified torque capacity.

Due to the considerable forces developed in the mechanism by torque it is essential that the effects of friction are limited by the use of appropriate bearings. Also, all reactive forces must be properly constrained for the mechanism to be useful.

As there are no timing valves or other commutating arrangements to lose or restrict the flow of fluid, the working pressure and displacement can be considerable. The limiting factors on the pressure are determined by the capability of the hydraulic connection and the rate at which fluid can escape from the cylinders past the pistons. The rate at which fluid can alternate between generator and motor without significant heating and pressure drop determines the maximum operating speed of the device. The flow rate is a function of the length and cross sectional area of the hydraulic connections.

The need for a low friction mechanism suggests the use of cranks or eccentrics driving pistons by means of connecting rods. Many of the devices in the prior art use cranks in their motor or generator. However, the tilting of the connecting rods relative to the direction of piston travel results in piston motion which is significantly asymmetric and non-sinusoidal relative to the circular motion of the crankshaft.

Sinusoidal piston motion has the advantage that one type of mechanism can be used both as motor and generator. The fluid displaced is proportional to the sine of each piston's eccentric angle and the torque produced is proportional to the cosine of the angle. The top dead center position of a piston corresponds to an angle of 90 degrees. The cosine torque relationship created by the sinusoidal piston motion develops a uniform torque versus hydraulic pressure characteristic, resulting in a more gradual pressure rise and fall than can be achieved with a crank and connecting rods. This gives rise to an improved torque characteristic and reduces stress and vibration. Sinusoidal piston motion greatly benefits the process of synchronizing the motor and generator and assists the mechanisms required to maintain the correct fluid volume in each phase. Methods to achieve synchronization and correct fluid volume will be identified in the description of the present invention.

Patents previously issued by the U.S. Patent Office which pertain to the art of polyphase synchronous hydraulic power transmission include U.S. Pat. Nos. 386,116 1,432,673 1,931,952 2,198,965 2,584,659 2,597,050 3,938,332 and 4,781,025.

U.S. Pat. No. 386,116 connects crank driven pistons in opposition and suffers from hydraulic lock because the displacements between motor and generator are substantially non-complementary during a cycle. U.S. Pat. No. 1,931,952 solves this problem and maintains complementary displacement by causing the generator crank to pull rather than push fluid out of the cylinders. Other devices use cams shaped to generate complementary displacements when used in conjunction with crank driven pistons. U.S. Pat. Nos. 2,584,659 and 2,597,050 achieve symmetrical and complementary displacement by generating sinusoidal piston motion from eccentric circular cams which impinge on cam followers attached to the pistons.

Cams, though, have limitations. Due to the small cam slope, only a small component of the force exerted by a piston tends to cause rotation which increases the phase pressure required for a given amount of torque. Substantial friction is generated by the cam follower exerting a large force towards the center of the cam, applied on a small area with high sliding speed.

The friction loss may be tolerable in a generator if the source of power is substantial but it will limit the power output of a motor. The torque output of the motor is also limited by the low torque to hydraulic pressure ratio and compounded by the torque lost overcoming internal friction. U.S. Pat. No. 1,432,673 employs a rolling ball cam follower to reduce friction in the motor, but the ball can develop enough pressure at the point of contact with the cam to deform the cam surface.

The device described in U.S. Pat. No. 2,198,965 does not use cranks or cams and has substantially similar mechanisms for motor and generator, but the coupler rings in the motor and generator will both rotate in response to the reactive forces generated while supplying torque to the motor's drive shaft. This imposes serious limitations on torque capacity as the bellows stems will interfere with the bellows anchor plate. If the motor is required to deliver any torque, the cantilever forces exerted on the stems in both generator and motor will result in damage and potential failure of the mechanisms. The tilting of the stems caused by the rotation of the coupler rings also allows changes in the volume of each phase and may allow the motor to stall.

The prior art makes no reference to piston seals. U.S. Pat. Nos. 1,931,952 and 2,198,965 employ bellows to prevent fluid loss but these will tend to collapse under the high pressures generated by torque. The resulting change in the volume of the hydraulic phase may allow stalling.

Some inventions incorporate elasticity into each phase, such as the condensers referred to in U.S. Pat. No. 1,432, 673. These allow the volume of each hydraulic phase to increase in response to increased hydraulic pressure. This limits torque capacity, as fluid temporarily lost into the condensers under load may allow the motor to stall.

There is no method in the prior art which allows the motor and generator to be isolated and subsequently dynamically re-synchronized. This, of course, would be desirable for example, in the adoption of such a system in a four-wheel drive application. U.S. Pat. No. 2,597,050 incorporates a by-pass valve which can be opened to allow the generator to return fluid to the reservoir while the motor is prevented from rotating by closing some of its phase connections. Closing the by-pass valve while the generator is rotating results in considerable stress on the system due to the rapid pressure increase in the hydraulic phase connections. Lowering the pressure limit of the spring loaded check valve may help to protect the system from failure but this may also prevent the motor from starting under load and will limit the torque capacity of the system.

It is therefore an object of this invention to provide an hydraulic, polyphase motor-generator (PMG) system employing pistons wherein the pistons in the motor and generator have sinusoidal displacement.

It is another object of this invention to provide a coupling means between the shaft and the motor or generator housing which absorbs the reactive forces generated, thereby optimizing the torque transmitting capacity of either unit.

It is still another object of this invention to provide means for isolating and subsequently dynamically, re-synchronizing the motor and generator.

BRIEF SUMMARY OF THE INVENTION

The preferred embodiment of the present invention has two hydraulic polyphase motor-generators (PMGs) connected by rigid or flexible phase pipes filled with an hydraulic fluid medium. The three cylinders in each PMG contain pistons which have sinusoidal displacement. This allows like PMGs to be interconnected and used symmetrically as motor or generator. While transmitting torque and power, the motor and generator maintain a nominal 180 degree angle between their respective drive shafts. The cylinders are arranged axially, resulting in a compact mechanism capable of developing substantial torque. High efficiency is obtained through the use of low friction bearings between all load bearing elements. The volume and pressure of fluid in the phases is maintained by piston seals.

The sinusoidal displacement allows the motive force between PMGs to be interrupted by letting the fluid exchange between the phases through a mixer valve. The motive force can be restored by progressively closing the mixer valve which causes the fluid to be distributed between the phases as the PMGs rotate. The mechanical action can also be completely isolated from the hydraulic action by allowing fluid to return to the reservoir so that the pistons do not move when the drive shaft rotates.

DESCRIPTION OF THE PREFERRED EMBODIMENTS

Figure 1:
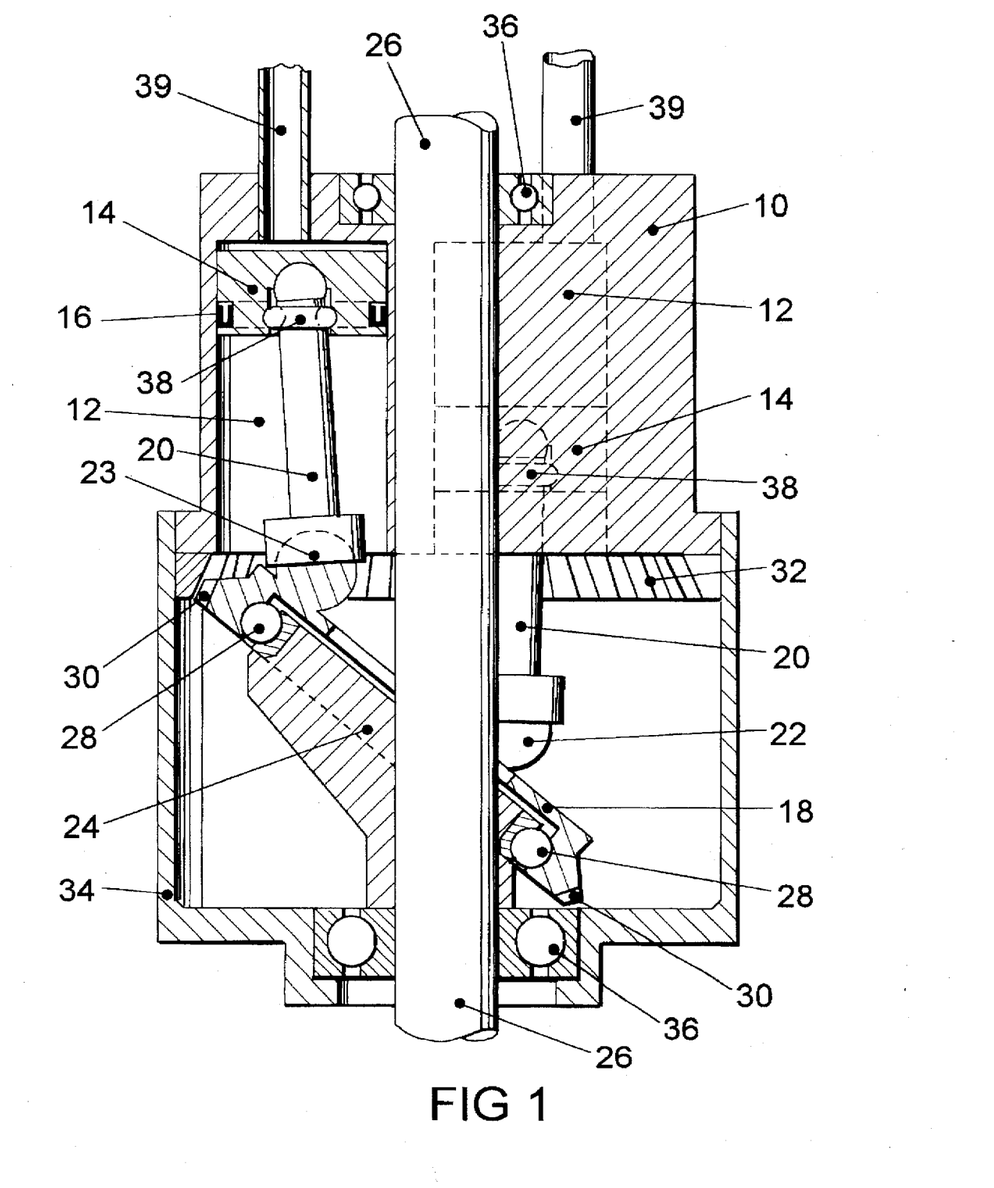
FIG. 1 is a sectioned elevation view of a PMG.

Referring to FIG. 1, one embodiment of the present invention consists of two interconnected polyphase motor-generators (PMGs), each with a cylinder block 10 containing three axially arranged cylinders 12 displaced at 120 degree intervals about the central axis (only two are indicated in FIG. 1). Reciprocating members, such as pistons 14 equipped with compliant seals 16 are inserted into the cylinders 12. The pistons 14 drive a connecting plate 18 by pushrods 20 which bear on spherical bearings 22 secured to and projecting from the connecting plate 18, through semispherical, complementing cups, 23. The connecting plate 18 drives a swash plate 24 which is rigidly attached to a rotating member, drive shaft 26. The connecting plate 18 is supported on the swashplate 24 by the connecting plate bearing 28.

The connecting plate 18 is prevented from rotating by teeth 30 formed around it's periphery which mesh with an annular toothed ring 32 formed on the inside of the swashplate housing 34. The toothed ring 32 has the same number of teeth as the connecting plate and, in consequence, the pitch circle diameters of the teeth 30 on the periphery of the connecting plate, and the toothed ring 32, are equal. The drive shaft 26 is supported on either side of the swashplate 24 by ball bearings 36 in the swashplate housing 34 and cylinder block 10.

The pushrods 20 are retained in the pistons by elastomeric O-rings 38 which seat in grooves in the pushrods 20 and pistons 14. The O-rings 38 maintain coaxial alignment between the piston and pushrod when the pushrod is not in contact with the spherical bearing 22. This allows the pushrods to engage with the spherical bearings at any point in the swashplate cycle. The three cylinders in each PMG are interconnected by means of the phase pipes 39.

Friction is kept to a minimum by the use of rolling bearings between all rotating elements and by giving sliding surfaces large contact areas, e.g. the spherical bearing-cup, 22–23, interface.

This embodiment results in sinusoidal piston motion relative to the rotation of the drive shaft. When plotted against the angular displacement of the drive shaft the motion of the three pistons generates three sinusoidal waves with phase differences of 120 degrees. The angle of inclination of the connecting plate 18 determines the piston stroke and amplitude of the sine wave. The geometry of the mechanism is such that a pure sine wave is generated regardless of the inclination angle of the connecting plate and the length of the pushrods.

Figure 2:
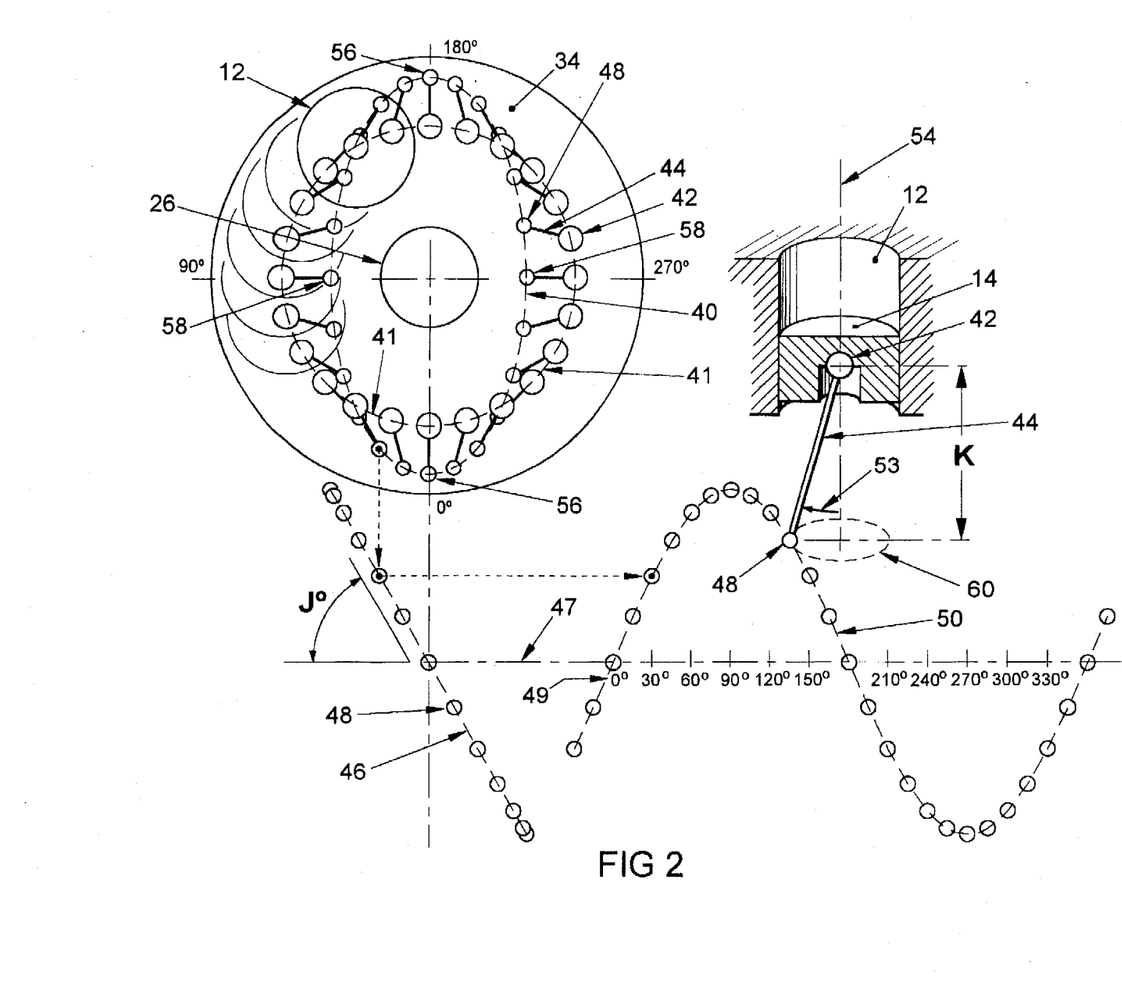
FIG. 2 is a combined visualization and graph describing how sinusoidal piston motion is developed from the rotation of the drive shaft of the PMG.

The diagram in FIG. 2 describes the means by which sinusoidal motion is developed from the rotation of the drive shaft and transmitted to the piston without distortion. To observe the relative motion between the elements of the invention, FIG. 2 is generated by rotating the swashplate housing 34 while the drive shaft 26 is held stationary. (The relative motion between drive shaft and housing is identical to a stationary housing with a rotating drive shaft.) The gear teeth 30 on the connecting plate, meshing with the toothed ring 32 in the swashplate housing, cause the housing and connecting plate to rotate around their respective axes with identical rotational speed relative to the drive shaft.

For clarity, the position of the cylinder 12 is only shown between 75 and 150 degrees. The ellipse 40 is the locus of the point where the lengthwise axis of a pushrod 20 intersects the center of a spherical bearing 22, viewed end on to the drive shaft 26. Circle 41 is the locus of the point where the lengthwise axis of the same pushrod intersects the central axis 54 of a piston 14. The two loci are generated by plotting these points of intersection for every 15 degrees of rotation of the swashplate housing 34 round the drive shaft 26. Circles, as at 48, represents the position of the spherical bearing on the connecting plate at each 15 degree interval. Similarly, circles as at 42, represent the position of the bearing surface in the piston every 15 degrees. The lines, as at 44, represent the direction of the same pushrod's lengthwise axis as it would appear in this view.

Examination of the loci 40 and 41 shows that the axis 54 of the cylinder 12 (which always coincides with the locus 41) is located at the mean position between the maximum 56 and minimum 58 radial displacements of the spherical bearing.

Further examination of the loci 40 and 41 reveals that when the drive shaft 26 is actually rotating and the swashplate housing 34 is held stationary, (which is the actual mode of operation of the invention), the spherical bearing position 48 on the connecting plate will rotate around the axis 54 of the cylinder 12, describing a circular orbit as shown at 60. A spherical bearing 22 completes 30 degrees of orbit for every 15 degrees of drive shaft rotation and will therefore make two complete orbits round the cylinder's axis 54 for each revolution of the drive shaft 26.

The locus 46 is an elevation view of the locus 40. It shows the plane of the connecting plate's spherical bearings inclined at J degrees relative to the plane of rotation 47 of the drive shaft 26. The position of the spherical bearing 48 is again shown every 15 degrees. (Note that angle J is set at 60 degrees to amplify the radius of the pushrod orbit for illustration purposes.)

The progression of the position of the spherical bearing 48 along locus 46 is mapped against the angle 49 between the drive shaft 26 and the swashplate housing 34. A sinusoidal locus 50 results for each revolution of the drive shaft.

The circular orbit 60 of the spherical bearing round the cylinder axis 54 results in the pushrod 44 maintaining a constant angle (or tilt) 53 relative to the piston axis 54 irrespective of the piston's (14) position in the cylinder 12. Therefore, the distance, in the direction of the cylinder's axis 54, between the piston 14 and the spherical bearing 48 is also always constant. This distance is indicated by letter K. Now, as shown by locus 50, the motion of the spherical bearing is perfectly sinusoidal in the direction of travel of the piston 14 along cylinder axis 54, and the distance between the piston and spherical bearing is constant in the same direction (letter K) and therefore the piston motion and, consequently, the volumetric displacement are perfectly sinusoidal also. This holds true regardless of the length of the pushrod 44 or the angle of inclination of the connecting plate as indicated by letter J.

Examination of the sinusoidal locus 50 shows that the piston is at its mean position in the cylinder when the drive shaft is at 0 and 180 degrees (for that one piston). The datum position of the drive shaft for a particular piston is defined when the spherical bearing which drives that piston is at the "0" degree position as indicated on the loci 40 and 50.

Each of the pistons in a PMG has the same motion as a piston attached to a crankshaft by a connecting rod which is long enough (infinite in the limit) to produce sinusoidal motion at the piston. All crank and connecting rod devices have a piston stroke equal to twice the crank offset. Therefore, the equivalent crank offset of a PMG is half its piston stroke. The torque produced by a PMG is proportional to the equivalent crank offset. Increasing the inclination of the connecting plate increases the piston stroke and therefore the equivalent crank offset also, resulting in additional torque capacity without an increase in fluid pressure or cylinder bore.

Figure 3:
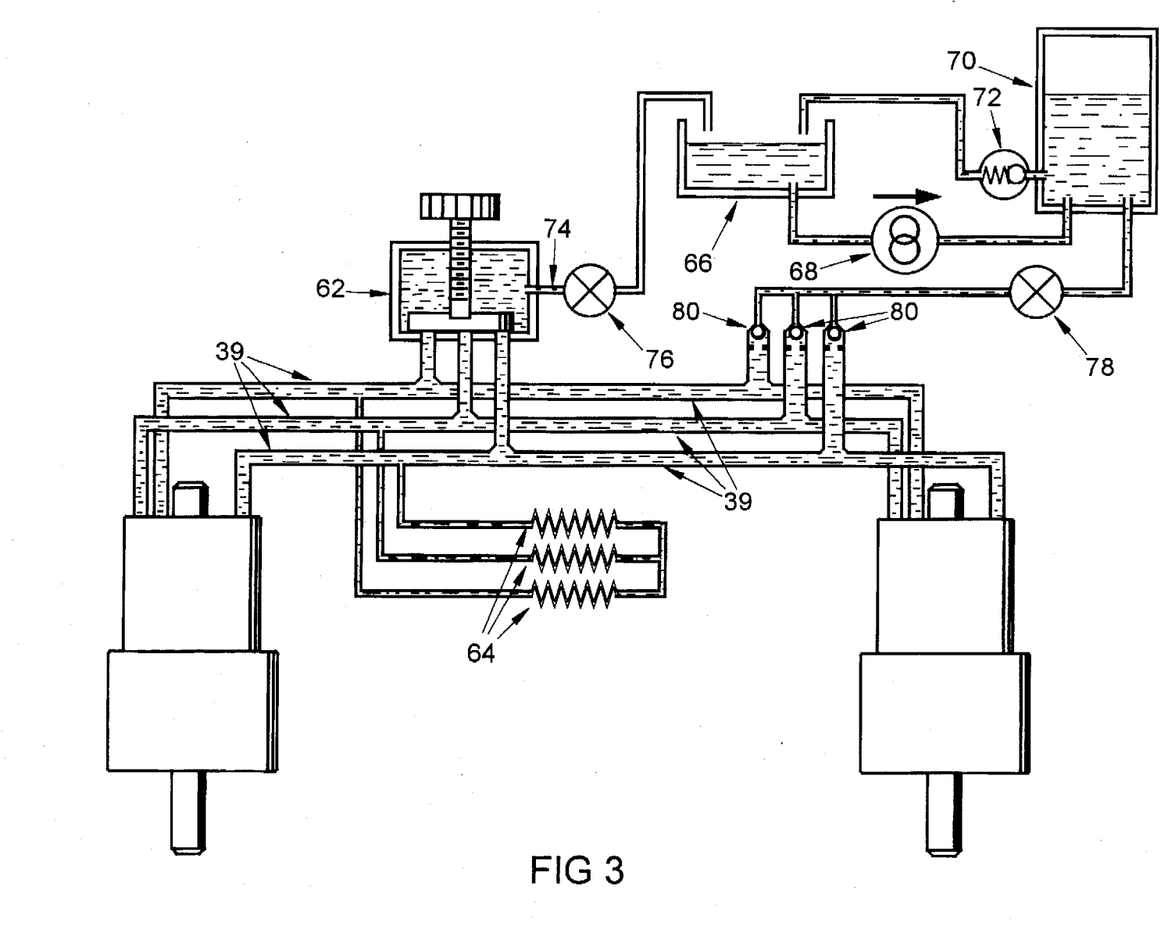
FIG. 3 is a functional schematic showing two interconnected PMGs.

Referring to FIG. 3, each phase pipe 39 consists of a combination of flexible and rigid sections with suitable unions. Connected to the three phase pipes 39 is a mixer valve 62 which allows the free exchange of fluid between all the phases. When the mixer valve 62 is closed, fluid cannot be exchanged between the phases.

The three phase pipes 39 are each connected to a long small bore equalizer pipe 64. The other ends of the equalizer pipes are connected together. This arrangement equalizes the mean pressure in the three phase connections over time. A similar arrangement is described in U.S. Pat. No. 1,432,673. The resistance to the flow of fluid created by the constricted bore and length of the equalizer pipes 64 prevents any rapid exchange of fluid between phases so that the nominal 180 degree angle between motor and generator is preserved.

An unpressurized reservoir 66 supplies fluid to a pump 68 by gravity. The pump 68 maintains a constant pressure in a pressurized supply chamber 70 by means of a pressure relief valve 72 which allows excess fluid to vent back to the fluid reservoir 66. A return valve 76 in a return pipe 74 can be opened to allow fluid to pass from the central chamber of the mixer valve 62 to the fluid reservoir 66. The return valve 76 is closed during the normal operation of the PMGs.

Fluid can flow from the pressurized supply chamber 70 through a feed valve 78 into the three phase pipes 39. The feed valve 78 can be closed but is kept open during the normal operation of the PMGs to keep the phases filled with fluid. A check valve 80 is installed between each phase pipe 39 and the feed valve 78. While the feed valve 78 is open each phase pipe 39 is maintained at a minimum pressure equal to that of the pressurized supply chamber 70. The check valves 80 prevent any fluid returning to the pressurized supply chamber 70 from the phases when, for example, the phase pressures rise under load conditions.

The minimum pressure in the pressurized supply chamber 70 is set at a level which ensures that the pushrods 20 maintain contact with the connecting plate's spherical bearings 22 throughout a cycle and that any fluid which might be lost past the compliant seals 16 is replaced during the low pressure half cycle of the phase.

Operating in conjunction with the equalizer pipes 64, this arrangement also provides a means to automatically compensate for elasticity in the phase connections. Due to the elasticity in a phase connection and to a small extent the fluid itself, as the load increases, the motor will tend to deviate from the nominal 180 degree angle relationship with the generator. At the same time a phase which is not at that moment propelling the motor will experience a small increase in fluid capacity as a result of this deviation from the 180 degree angle. As this phase is also in the low pressure half of its cycle the pressurized chamber 70 will be able to supply it with additional fluid until it attains the minimum pressure. This phase is now filled slightly above its nominal working volume. While this phase is propelling the motor during its high pressure half cycle, the equalizing pipes allow the additional fluid to be gradually distributed among all the phases.

The net result is that the minimum pressure in all the phases will rise above that of the pressurized chamber. Raising the minimum phase pressures in this manner reduces the amount of pressure change experienced by a phase during a cycle which in turn reduces the effect elasticity has on the phase. The amount of compensation automatically increases as the torque being generated by the motor increases.

The above embodiment employs identical interconnected PMGs, however non-identical but compatible PMGs can also be interconnected. To be compatible they must have sinusoidal displacement, the same number of phases and displace the same volume of fluid per phase.

Figure 4A:
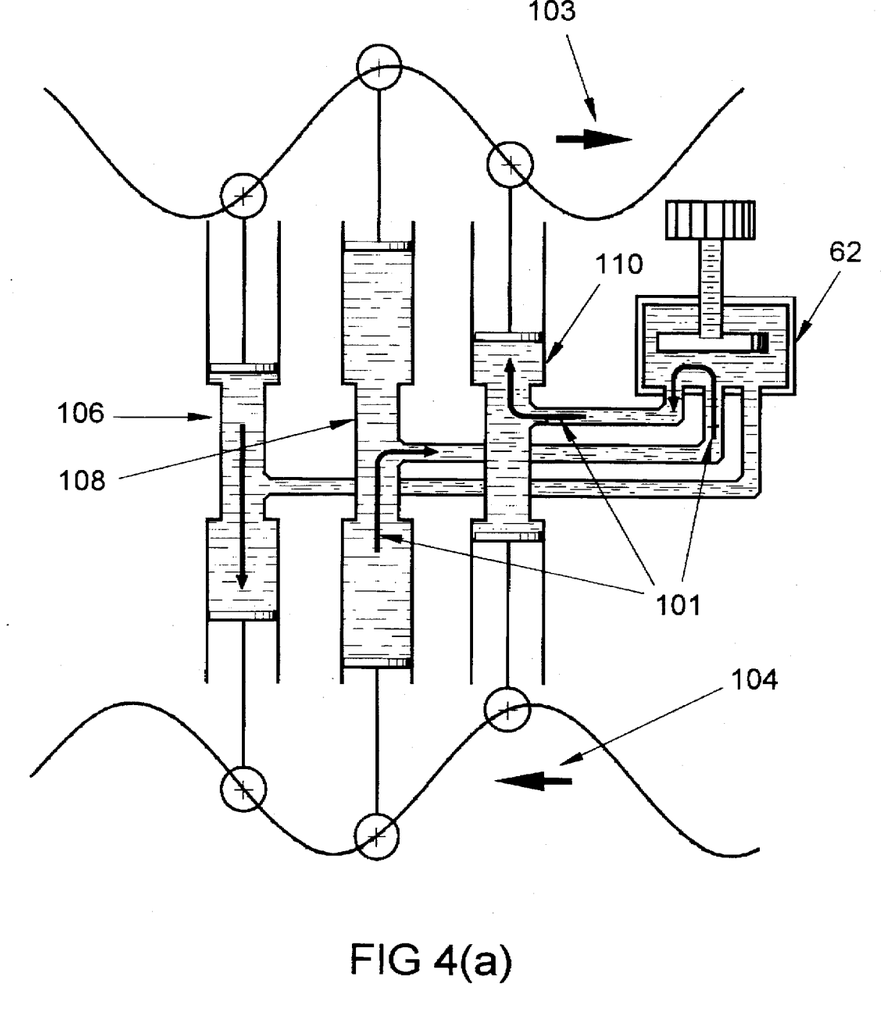
FIGS. 4(a) and (b) are functional views illustrating an important principle of the present invention.
Figure 4B:
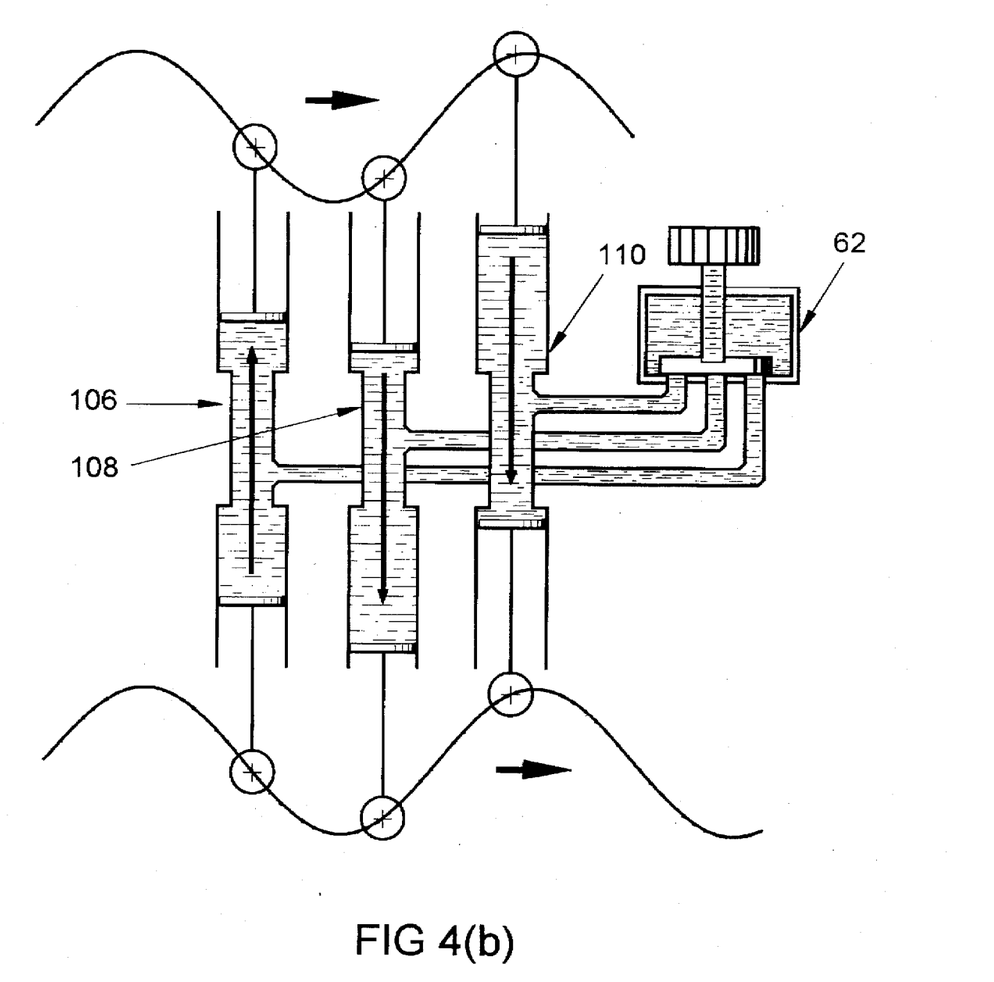

One of the objectives of the invention is to be able to disconnect and reconnect the motive force between PMGs when required. FIG. 4(a) and FIG. 4(b) illustrate the movement of fluid within the system in the disconnect and connect modes. As illustrated in FIG. 4(a), by opening the mixer valve 62 which allows the free passage of fluid between all the phases of two interconnected PMGs, the motive force is disconnected and each PMG is allowed to rotate asynchronously, as indicated by arrows 103 and 104. (Note also the lack of synchronization of the two sinusoids.) The total volume of fluid contained within the phases does not change, only the distribution between the phases, as indicated at arrows 101, is continuously changing as the PMGs rotate asynchronously.

At the instant shown, phase 108 has excess fluid to allow synchronization and is expelling it into phase 110 which has insufficient fluid for synchronization. Phase 106 actually contains the correct volume to allow synchronization. Note that both pistons in phases 108 and 110 are moving in the same direction but their rates of motion are different. Thus, the slower pistons have a slower rate of displacement, causing an exchange of fluid via the mixer valve 62.

When the PMGs are rotating asynchronously with the mixer valve open, the volume of each phase will alternately expand and contract. (The volume varies plus and minus the displacement of one cylinder from the nominal synchronized volume). The nominal synchronized volume is the phase volume while the motor and generator drive shafts are 180 degrees apart. Referring to FIG. 4(a), phases in which the net volume of fluid is reducing, 108, will pump fluid 101 by way of the mixer valve into the phases in which the net volume is increasing, 110. Fluid is prevented from returning to either the reservoir 66 or pressurized supply chamber 70 by the check valves (80 in FIG. 3) and the closed return valve (76 in FIG. 3).

The greater the speed difference between two PMGs, the faster the fluid has to be pumped through the mixer valve by the phases which are contracting at that particular instant. Partially closing the mixer valve creates back pressure and slows down the rate at which a contracting phase can pump fluid through the mixer. This results in a reduction in the speed difference between the two PMGs. At the same time the rate at which expanding phases can accept fluid from the mixer has been reduced due to the reduced speed difference between the two PMGs.

The asynchronous rotation of the two PMGs and constant total volume of fluid in the phases is only possible because the algebraic sum of the fluid displaced by each PMG is zero at any drive shaft angle. The zero algebraic sum displacement of each PMG is in turn possible because of the .sinusoidal fluid displacement resulting from the sinusoidal motion of each piston.

When it is desired to reconnect the motive force between the PMGs, the mixer valve 62 is gradually closed while both PMGs are rotating asynchronously. The PMGs will be progressively synchronized with each other. Synchronization begins when the mixer valve creates more resistance to the flow of fluid (as at 101) between phases than the resistance presented by the opposing piston in the same phase. It is important to close the mixer valve slowly enough to allow time for the PMGs to synchronize during several revolutions. The phase pressures may become excessive if the mixer is closed too rapidly The synchronization process continues until the mixer valve is completely closed. See FIG. 4(b). Due to the zero-sum displacement which results from the sinusoidal piston motion of the PMGs, the total volume of fluid is still the same as when the PMGs were rotating asynchronously except that the fluid is now distributed between the phases. The volume in each phase now remains essentially constant as shown in FIG. 4(b). The two sinusoids are now synchronized. Only small amounts of fluid will continue to be exchanged between phases through the equalizer pipes (64 in FIG. 3).

Although it has been described above that the movement of the reciprocating members is defined, mathematically, by the sine of the angular displacement of the rotating member from a datum position, it is to be understood that, as long as the algebraic stun of the linear displacements for all reciprocating members is zero, the principles of the present invention will be similarly applicable to other hydraulic torque transmission systems.

While the displacement produced by sinusoidal piston motion is advantageous in accelerating the pistons and fluid, non-sinusoidal piston motion can be employed in a PMG, for example, to optimize torque transmission at low speed, or while the drive shafts rotate in a particular direction. Alternate piston motion may be generated through adaptations of the geometry described in the present invention or through the use of cams shaped to impart specific motion to pistons, examples of which are found in the prior art. Regardless of the means by which it is produced, to prevent deadly embrace conditions, the piston motion must result in a complementary exchange of fluid between the opposing pistons in the PMGs so that each phase maintains a constant volume when the PMGs are synchronized.

By only partially closing the mixer valve or arranging for it to open in response to pressure sensors in the phase connections, it can be used as a means to variably limit the torque transmitted between PMGs. Further, by partially closing the mixer valve it can be used as a means to variably limit the differential speed between two PMGs which are both being rotated by external motive forces.

It is also possible to cause the pistons to retract inside their cylinders such that the pushrods cannot impart thrust to the connecting plate. This results in total isolation of the PMGs from each other and prevents them from doing any work on the hydraulic fluid. In the motor vehicle case this isolated state can be enabled during favorable surface conditions to maximize fuel economy.

Isolation is achieved by closing the feed valve 78 which stops the supply of fluid to the phase pipes 39 from the pressurized supply chamber 70. The mixer valve 62 is fully opened and the return valve 76 is opened. This connects the central chamber of the mixer valve with the fluid reservoir 66. The PMGs are now allowed to rotate asynchronously. As they rotate they displace fluid from their cylinders which returns to the fluid reservoir through the return valve 76. As there is now no fluid available to propel the pistons they remain at the top of their stroke and the pushrods 20 no longer make contact with the connecting plate's spherical bearings 22.

Figure 5:
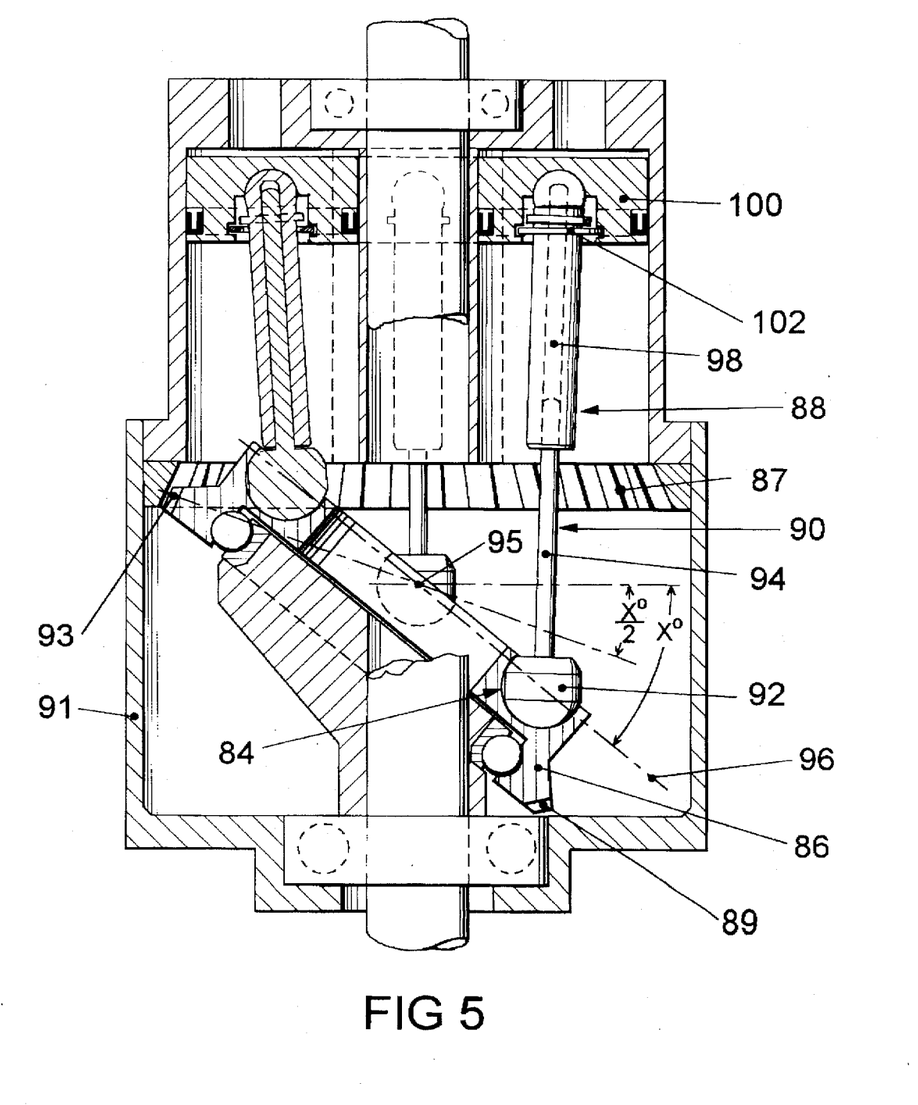
FIG. 5 is a sectioned elevation view showing a second embodiment which uses concave spherical bearings and telescoping two piece pushrods.
Figure 6:
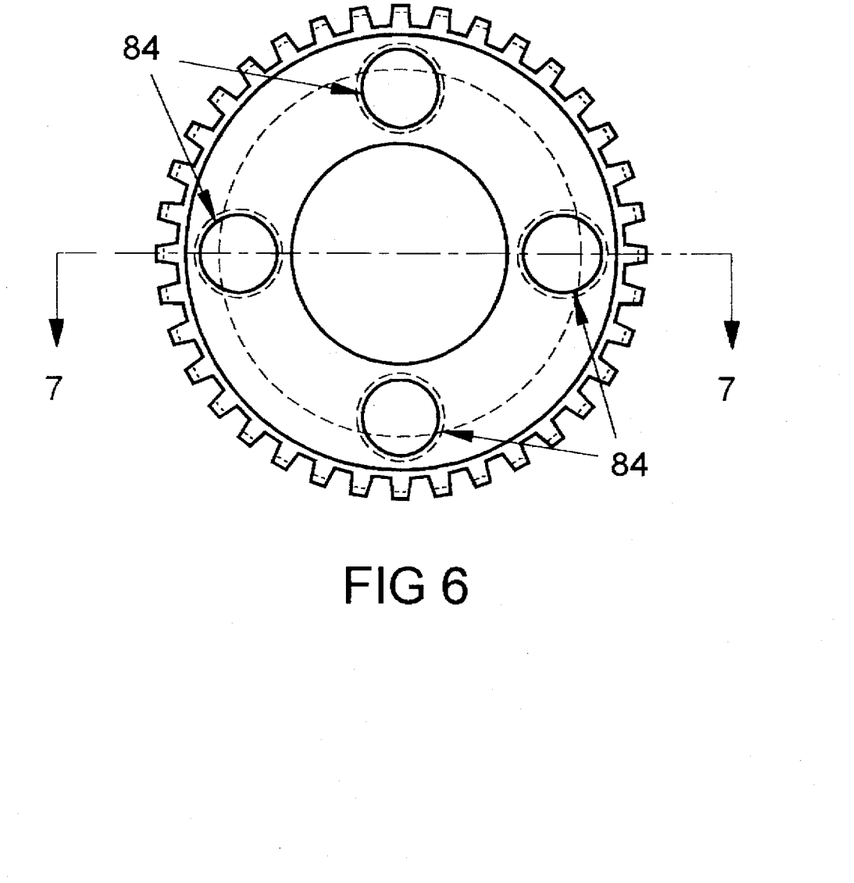
FIG. 6 is a plan view of the connecting plate portion of the embodiment of FIG. 5.
Figure 7:
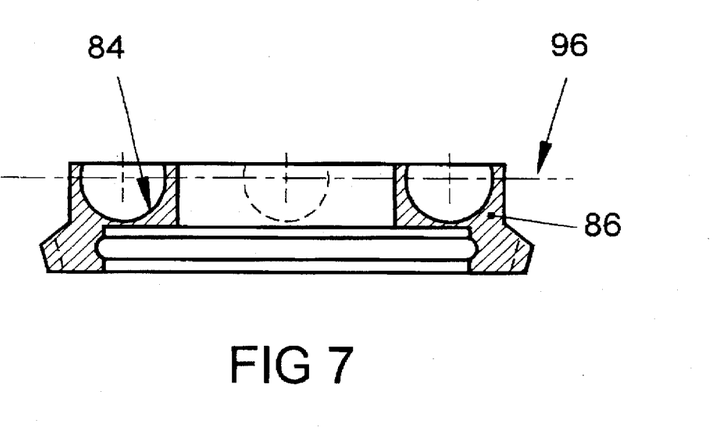
FIG. 7 is a sectioned, elevation view taken along lines 7—7 in FIG. 6.

The hydraulic action is restored by closing the return valve 76 and opening the feed valve 78. The mixer valve 62 remains open. The phases will be refilled from the pressurized supply chamber 70 via the feed valve 78 and check valves 80 causing the pushrods 20 to re-engage with the spherical bearings 22. A second embodiment of the present invention uses different pushrods and spherical bearings from the previously described embodiment. Both embodiments are functionally equal and interoperable with each other. As FIG. 5 illustrates, the second embodiment has concave spherical bearings 84 incorporated into the connecting plate 86. Two part pushrods 88 have one part 90 with a ball end 92 attached to a reduced diameter rod 94. The ball end 92 remains captive in a spherical bearing 84 as long as the rod 94 is tilted relative to the plane 96 through the center of the spherical bearings 84 in the connecting plate 86. The second part 98 of the pushrod 88 is retained in the piston 100 by a circular spring clip 102 at one end and is bored at its other end to accept the rod 94 of the first part 90, so that the two parts can telescope together.

While the phases remain full of fluid the two parts of the pushrod are forced together and it functions like a single piece pushrod. When the PMGs are isolated by returning fluid to the reservoir the piston and its part of the pushrod remain stationary while the connecting plate part telescopes in and out as the drive shaft rotates. The connecting plate part, rod 94, is always at least partially in the bore of the piston part 98. The telescoping action maintains the correct alignment between the two parts of the pushrod while hydraulic action is being restored by refilling the phases with fluid.

It should be noted that FIG. 5 illustrates an example of a four phase PMG with three of its cylinders shown. PMGs can be constructed which operate with two or more phases. A two phase system however will not be able to start from any angle, and would require some form of external starting device. Systems with at least three phases can start from any angle. Systems with more than three phases will share the hydraulic and mechanical loads between two or more phases and will be more compact but accordingly more complex.

FIG. 5 also illustrates the geometrical relationship of the connecting plate 86 to the toothed ring 87. The teeth 89 on the connecting plate 86 and the toothed ring 87 in the swashplate housing 91 should mesh at a point 93 which falls on a line with half the inclination, X, of the connecting plate, drawn from the point 95 where the axis of the drive shaft and the plane 96 of the spherical bearing centers intersect. Although this is illustrated for the embodiment in FIG. 5, of course it is the general rule. This meshing arrangement minimizes friction between the connecting plate teeth and the swashplate housing. The particular form (e.g. spur, helical, octoid, spherical) and number of teeth employed in the construction of a PMG will be determined by the torque and noise level required of the PMG.

Figure 8:
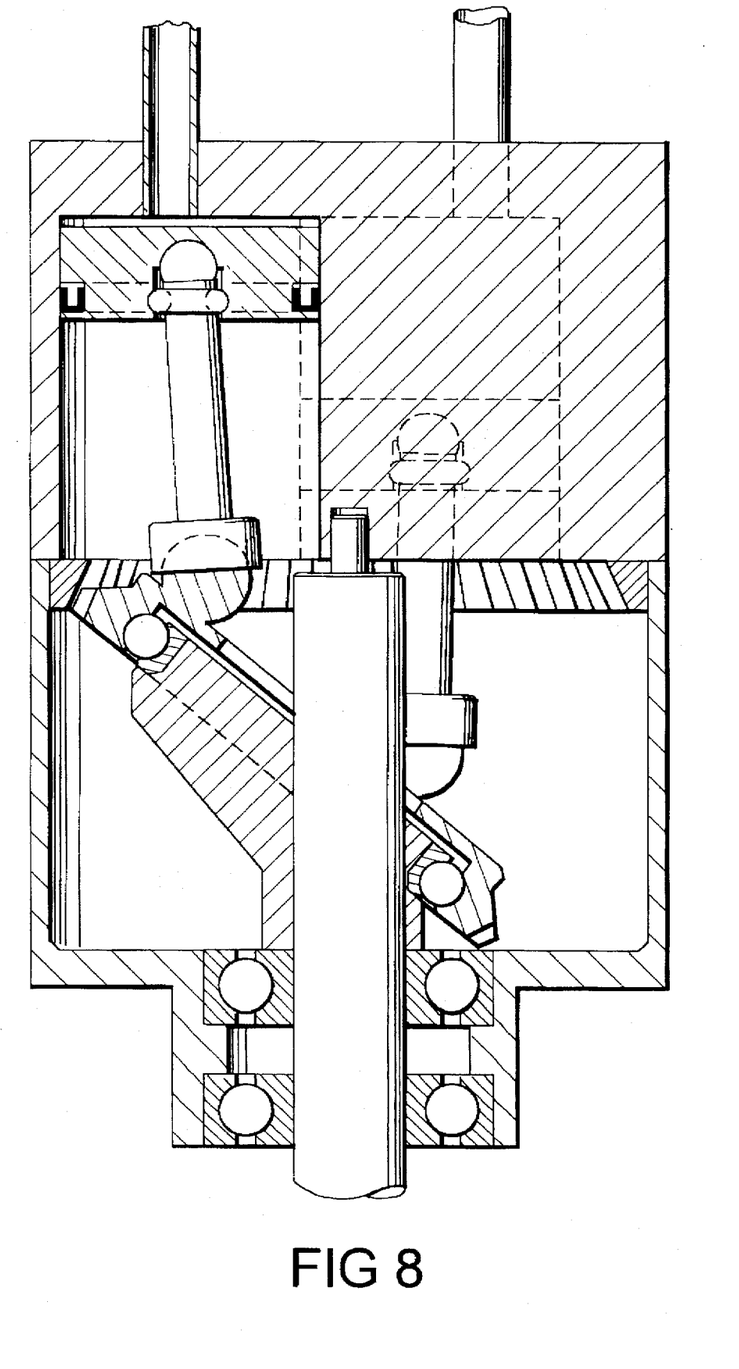
FIG. 8 is a sectioned, elevation view showing a third embodiment which accommodates a single ended shaft application.

A third embodiment of the present invention is illustrated in FIG. 8 which shows a PMG with a drive shaft at one end only. This configuration permits relatively larger bore cylinders than can be achieved with a double ended shaft configuration and therefore the single ended version can have a higher torque to size ratio.

Although not specifically limited to the following applications, the invention creates a means of hydraulically connecting the wheels of a vehicle with the transmission such that all the wheels can be driven to maintain adequate traction on surfaces with limited adhesion. The front and rear wheels on each side of the vehicle can be synchronously connected while still allowing differential rotation between the wheels on opposite sides of the vehicle. This arrangement maintains directional stability and aids in the steering of the vehicle. Alternatively, diagonally opposed wheels can be connected to improve traction on very poor surfaces.

While there have been shown and described preferred embodiments of an hydraulic torque transmitter and synchronizer in accordance with the invention, it will be appreciated that many changes and modifications may be made therein without, however, departing from the essential scope thereof as set out in the following claims.

What is claimed is:

1. An apparatus which translates the linear motion of one or more reciprocating members into the rotational motion of a rotating member or, alternately, translates the rotational motion of said rotating member into the linear motion of said reciprocating member or members, wherein the linear motion of the reciprocating members is in a direction parallel with the axis about which the rotating member rotates and the linear displacement from the mean position of each of the reciprocating members is defined by a mathematical function of the angular displacement of the rotating member from a corresponding datum position of the rotating member, a particular datum position having been defined for each reciprocating member, said apparatus further including, said rotating member constrained axially and radially in a housing by a first anti-friction mounting means, swash plate means, affixed to said rotating member, the plane of said swash plate means obliquely inclined to the plane perpendicular to the axis of said rotating member, connecting plate means, radially and axially constrained through attachment by a second anti-friction mounting means, to the obliquely inclined swash plate means, said connecting plate means prevented from rotating relative to the axis of rotation of said rotating member by means of first and second interlocking device means, said first interlocking device means affixed to said connecting plate means, said second interlocking device means affixed to the housing, said first interlocking device means meshing with said second interlocking device means, wherein the meshing of said first and second interlocking device means results in the rotational motion of said rotating member translating into swivelling action of said connecting plate means, or vice versa, said connecting plate means including one or more bearing means, corresponding in number to the number of said reciprocating members, and interconnecting means disposed in contact between each reciprocating member and each connecting plate bearing means, wherein the swivelling action of said connecting plate means is translated through said interconnect means into reciprocating linear motion of said reciprocating members, or, contrariwise, the reciprocating linear motion of said reciprocating members is translated through said interconnect means, into swivelling action of said connecting plate means and, in turn, rotational motion of said rotational member, wherein said mathematical function is a sinusoidal function thereof.

2. The apparatus claimed in claim 1, wherein the reciprocating members with linear motion are pistons enclosed within cylinders rigidly positioned in the housing.

3. The apparatus claimed in either claim 1 or claim 2 wherein there are at least two (2) reciprocating members disposed at equal angular intervals around said axis of rotation of said rotating member and at equal radial distances therefrom.

4. The apparatus claimed in either claims 1 or 2 further comprising, means to supply fluid under pressure in contact with each of said reciprocating members, said reciprocating members adapted to respond to said fluid under pressure, wherein the supplying of fluid under pressure is done in a predetermined way so that the linear motion of each said reciprocating members occurs in a synchronized manner with the linear motion of the remaining ones of said reciprocating members, so that said swivelling action and said angular motion occur in a synchronous manner.

5. An hydraulic torque transmission system including at least a first and second apparatus, wherein each said apparatus translates the linear motion of one or more reciprocating members into the rotational motion of a rotating member or, alternately, translates the rotational motion of said rotating member into the linear motion of said reciprocating member or members, wherein the linear motion of the reciprocating members is in a direction parallel with the axis about which the rotating member rotates and the linear displacement from the mean position of each of the reciprocating members is defined by a mathematical function of the angular displacement of the rotating member from a corresponding datum position of the rotating member, a particular datum position having been defined for each reciprocating member, said apparatus further including, said rotating member constrained axially and radially in a housing by a first anti-friction mounting means, swash plate means, affixed to said rotating member, the plane of said swash plate means obliquely inclined to the plane perpendicular to the axis of said rotating member, connecting plate means, radially and axially constrained through attachment by a second anti-friction mounting means, to the obliquely inclined swash plate means, said connecting plate means prevented from rotating relative to the axis of rotation of said rotating member by means of first and second interlocking device means, said first interlocking device means affixed to said connecting plate means, said second interlocking device means affixed to the housing, said first interlocking device means meshing with said second interlocking device means, wherein the meshing of said first and second interlocking device means results in the rotational motion of said rotating member translating into swivelling action of said connecting plate means, or vice versa, said connecting plate means including one or more bearing means, corresponding in number to the number of said reciprocating members, and interconnecting means disposed in contact between each reciprocating member and each connecting plate bearing means, wherein the swivelling action of said connecting plate means is translated through said interconnect means into reciprocating linear motion of said reciprocating members, or, contrariwise, the reciprocating linear motion of said reciprocating members is translated through said interconnect means, into swivelling action of said connecting plate means and, in turn, rotational motion of said rotational member, each said at least a first and second apparatus, including the same number of reciprocating members, there being at least two such reciprocating members, said hydraulic torque transmitting system further comprising:

phase pipe means interposed between corresponding reciprocating members in each said apparatus;

a fluid medium disposed in said phase pipe means; and, at least one mixer valve means interconnected between said phase pipe means, said mixer valve means adapted to move between a closed position and an open position, said fluid medium having at least a predetermined, minimum pressure when said mixer valve is at or near said closed position, whereby in said open position there is an interflow of said fluid medium between each said phase pipe means such that the transmission of torque and power between apparatus is interrupted, thereby allowing each apparatus to rotate independently of the other, said mixer valve means adapted to be progressively moved towards said closed position, whereby the interflow of said fluid medium between said phase pipe means is reduced as said mixer valve means moves towards said closed position, said minimum predetermined pressure at or near said closed position sufficient to maintain said interconnecting means disposed in contact between each reciprocating member and each connecting plate bearing means, and whereby the movement of the reciprocating members in each said apparatus eventually becomes synchronized, such that the transmission of torque and power between said rotating members occurs.

6. The hydraulic torque transmission system claimed in claim 5 wherein there are three reciprocating members in each of said apparatus.

7. The hydraulic torque transmission system claimed in either claim 5 or claim 6 wherein the reciprocating members with linear motion are pistons enclosed within cylinders rigidly positioned in the housing.

8. The hydraulic torque transmission system claimed in either claim 5 or claim 6 further comprising:

fluid supply means;

first and second valve means connected between said phase pipe means and said fluid supply means;

wherein each said interconnecting means is maintained in its disposition in contact between each reciprocating member and its corresponding connecting plate bearing means only in the presence of at least said predetermined minimum pressure exerted by said fluid medium on each said reciprocating member, said first valve means adapted to return at least a portion of said fluid medium from said phase pipe means to said fluid supply means, said second valve means being in a closed position, such that the pressure of said fluid medium is reduced below said predetermined minimum pressure, whereby, each said interconnecting means is disconnected in its disposition between each reciprocating member and each connecting plate bearing means, such that there is no transmission of movement between said connecting plate means and said reciprocating member;

said second valve means adapted in an open position to return an amount of said fluid medium from said fluid supply means to said phase pipe means, when said first valve means is in a closed position, to raise the pressure of the fluid medium on each said reciprocating member to at least said predetermined minimum pressure, whereby each said interconnecting means is maintained in its disposition in contact between each said reciprocating member and its corresponding connecting plate bearing means such that transmission of movement between said connecting plate means and said reciprocating member occurs.

9. The apparatus or hydraulic torque transmission system as claimed respectively in either claims 5 or 6 wherein said mathematical function of the angular displacement is the sine of the angular displacement.

10. The hydraulic torque transmission system claimed in claim 8 wherein said mathematical function of the angular displacement is the sine of the angular displacement.

11. The apparatus as claimed in claim 3 further comprising, means to supply fluid under pressure in contact with each of said reciprocating members, said reciprocating members adapted to respond to said fluid under pressure, wherein the supplying of fluid under pressure is done in a predetermined way so that the linear motion of each said reciprocating members occurs in a synchronized manner with the linear motion of the remaining ones of said reciprocating members, so that said swivelling action and said angular motion occur in a synchronous manner.

12. The apparatus claimed in claim 11 wherein said mathematical function of the angular displacement is the sine of the angular displacement.

\* \* \* \* \*